United States Patent
Bakke et al.

(10) Patent No.: US 11,103,104 B2
(45) Date of Patent: Aug. 31, 2021

(54) DISPENSING GROUP FOR AN ESPRESSO COFFEE MACHINE WITH FRONTAL INSERTION OF THE FILTER HOLDER

(71) Applicant: LA MARZOCCO S.R.L., Scarperia (IT)

(72) Inventors: Kent Bakke, Seattle, WA (US); Roberto Bianchi, Scarperia (IT); Riccardo Gatti, Scarperia (IT); Anke Kempen, Rotterdam (NL); Eric Verberkmoes, Rotterdam (NL); Houdijn Beekhuis, Rotterdam (NL); Maarten Wilming, Rotterdam (NL)

(73) Assignee: LA MARZOCCO S.R.L., Scarperia (IT)

( * ) Notice: Subject to any disclaimer, the term of this patent is extended or adjusted under 35 U.S.C. 154(b) by 1 day.

(21) Appl. No.: 16/070,621

(22) PCT Filed: Feb. 2, 2017

(86) PCT No.: PCT/EP2017/052213
§ 371 (c)(1),
(2) Date: Jul. 17, 2018

(87) PCT Pub. No.: WO2017/134141
PCT Pub. Date: Aug. 10, 2017

(65) Prior Publication Data
US 2020/0237137 A1    Jul. 30, 2020

(30) Foreign Application Priority Data
Feb. 3, 2016  (IT) .................... 102016000010850

(51) Int. Cl.
*A47J 31/36* (2006.01)
*A47J 31/54* (2006.01)
(Continued)

(52) U.S. Cl.
CPC ........... *A47J 31/54* (2013.01); *A47J 31/0663* (2013.01); *A47J 31/3614* (2013.01);
(Continued)

(58) Field of Classification Search
CPC .. A47J 31/30; A47J 31/32; A47J 31/34; A47J 31/36; A47J 31/3604; A47J 31/3614;
(Continued)

(56) References Cited

U.S. PATENT DOCUMENTS 5,259,297 A * 11/1993 Giuliano ............... A47J 31/007
99/282
5,555,791 A    9/1996 McNeill et al.
(Continued)

FOREIGN PATENT DOCUMENTS

CN    100588354 C    2/2010
CN    202179442 U    4/2012
(Continued)

OTHER PUBLICATIONS

International Search Report for PCT/EP2017/052213, dated May 4, 2017, 3 pages.

*Primary Examiner* — Reginald Alexander
(74) *Attorney, Agent, or Firm* — Nixon & Vanderhye P.C.

(57) ABSTRACT

A dispensing group for an espresso coffee machine is described. The group comprises: a coffee boiler configured to contain pressurized hot water; a supply duct for feeding hot water under pressure towards a puck of coffee powder; and a filter-holder support comprising guides (30) which form at least one sliding surface for slidably supporting a filter holder, wherein said filter-holder support is rotatable between a first position for inserting the filter holder and a second dispensing position and wherein said dispensing group comprises a mechanical locking device for locking the filter-holder support in the second dispensing position.

18 Claims, 13 Drawing Sheets

(51) Int. Cl.
*A47J 31/44* (2006.01)
*A47J 31/06* (2006.01)
*A47J 31/46* (2006.01)

(52) U.S. Cl.
CPC ....... *A47J 31/3671* (2013.01); *A47J 31/4467* (2013.01); *A47J 31/0657* (2013.01); *A47J 31/36* (2013.01); *A47J 31/3666* (2013.01); *A47J 31/4471* (2013.01); *A47J 31/46* (2013.01)

(58) Field of Classification Search
CPC ................ A47J 31/3666; A47J 31/3671; A47J 31/0657; A47J 31/0663; A47J 31/4467
See application file for complete search history.

(56) References Cited

U.S. PATENT DOCUMENTS

| | | | | |
|---|---|---|---|---|
| 5,870,943 A | * | 2/1999 | Levi | A47J 31/0647 99/287 |
| 8,215,229 B2 | * | 7/2012 | Faccinti | A47J 31/469 99/280 |
| 8,272,319 B2 | * | 9/2012 | Jarisch | A47J 31/3633 99/289 R |
| 8,895,095 B2 | | 11/2014 | Star et al. | |
| 9,578,986 B2 | | 2/2017 | Ceotto et al. | |
| 10,602,874 B2 | * | 3/2020 | Cable | A47J 31/407 |

FOREIGN PATENT DOCUMENTS

| | | |
|---|---|---|
| CN | 104619218 A | 5/2015 |
| EP | 0 838 185 | 4/1998 |
| EP | 1 034 729 | 9/2000 |
| EP | 1 688 072 B1 | 8/2006 |
| EP | 2 490 578 | 9/2013 |
| FR | 2 901 681 | 12/2007 |
| WO | 2006/082064 | 8/2006 |
| WO | 2011/095926 | 8/2011 |
| WO | 2015/055557 | 4/2015 |

\* cited by examiner

DISPENSING GROUP FOR AN ESPRESSO COFFEE MACHINE WITH FRONTAL INSERTION OF THE FILTER HOLDER

This application is the U.S. national phase of International Application No. PCT/EP2017/052213 filed 2 Feb. 2017, which designated the U.S. and claims priority to IT Patent Application No. 102016000010850 filed 3 Feb. 2016, the entire contents of each of which are hereby incorporated by reference.

The present invention relates in general to the sector of machines for the preparation of beverages. More particularly it relates to a dispensing group provided with an engaging system for a filter holder of the frontal type and an associated espresso coffee machine with at least one such group.

EP 2 490 578 describes an improved filter holder for an espresso coffee machine.

The known filter holders comprise a substantially cylindrical body which is open at the top and bottom and provided with a (single or double) spout. The cylindrical body is configured to receive a filter filled with coffee powder. The filter generally has a top rim suitable for resting on the open edge of the substantially cylindrical body. The bottom of the filter is provided with holes such that the prepared beverage is able to flow towards the spout.

A filter holder is configured to engage onto the bottom part of a dispensing group. Each filter holder generally has a handle for supporting it when the filter is filled and when the filter is emptied/cleaned. The handle is also used when the filter holder is engaged with the dispensing group or when it is disengaged.

Typically, a filter holder is engaged with the group by means of a screwing movement. Typically, each filter holder has two flanges projecting outwards from the cylindrical body. The two flanges are situated radially opposite each other and are suitably shaped so as to form, substantially, a portion of a thread of a screw. The bottom part of the filter holder is provided with a circular guide suitable for receiving the thread formed by the two flanges.

In order to engage correctly a filter holder in the associated dispensing group, a bartender grips the handle of the filter holder and moves the filter holder towards the group until it reaches the correct engaged position. After reaching this engaged position, the bartender rotates the filter holder in an anti-clockwise direction into the position close to the end-of-travel position and then completes engagement by forcing the filter holder to rotate a few more degrees so as to stably lock the filter holder together with the group and ensure sealing of the top edge of the filter with the sealing gasket mounted in the bottom part of said dispensing group.

In order to disengage the filter holder, the bartender first moves the filter-holder handle in the clockwise direction and then continues to rotate the filter holder into the position where the two flanges are no longer supported in the circular guide of the dispensing group and the filter holder is free to separate completely from the dispensing group.

A bartender performs this engaging and disengaging movement dozens or even hundreds of times during the course of a working day.

The Applicant has noticed that the engaging movement and the associated disengaging movement are unnatural and awkward and require a significant amount of effort.

WO 2006/082064 A1 discloses a device for preparing a drink from a capsule injection of a pressurized fluid and capsule-holder adapted therefore.

WO 2011/095926 A2 discloses a machine for the preparation of a beverage.

U.S. Pat. No. 5,555,791 A discloses a beverage dispensing apparatus having articulated basket holding arms for baskets having varying dimensions.

EP 0 838 185 A1 discloses an espresso coffee machine.

EP 1 034 729 describes an espresso coffee machine with a coffee-holder cup designed to receive a rigid filtering container such as a rigid pod. The cup engages slidably with a support fork so as to move transversely along the fork itself until it is arranged below and, in a position coaxial with, a piston passed through by hot water under pressure and designed to engage frontally and in a fluid-tight manner, under the thrust of the hot water under pressure, with an edge of the rigid filtering container.

WO2015055557 describes a device for inserting a filter holder into a coffee dispensing group. The insertion device comprises a cup-shaped container which houses internally a perforated filter for containing the coffee powder and which has, extending therefrom, a handle for manipulating said container. The cup-shaped container has two flanges which are designed to engage with an engaging element connected to the coffee machine and comprising slide means inside which the flanges of the cup-shaped container engage slidably along a straight path.

SUMMARY OF THE INVENTION

WO 2006/082064 A1 discloses a device for preparing a drink from a capsule injection of a pressurized fluid and capsule-holder adapted therefore. The device is only configured for capsules and it is not adapted to prepare an espresso coffee from coffee powder in a filter hold by a filter-holder. The capsule holder only carries out a translational movement. The supply unit comprises a main guide and reception base intended to receive the capsule-holder in the unit—a position in which the injector is placed with reference to the fluid supply means of the supply unit. The supply unit thus has a second part called the supply base which actually supports the fluid supply means. The guide base and the supply base are mounted articulated relative to one another so that the supply base and the guide base may adopt at least two relative positions.

The Applicant has noted that in the solution described in WO2015055557 it is necessary to displace, by means of a toggle lever mechanism, a series of parts such as rods for locking the filter holder and a movable plate with which a piston is associated. This solution is bulky, complicated and costly and increases the time needed to prepare an espresso coffee. Moreover an additional motor is required to displace the movable plate towards the filter holder and bring it into a rest position ready for extracting the filter holder with the used coffee powder (and for inserting the filter holder with fresh coffee powder).

The object proposed by the Applicant is to provide a more efficient and practical system for connecting a filter holder to a dispensing group of an espresso coffee machine which overcomes, at least partly, the drawbacks of the known solutions.

According to the Applicant, this object, together with other objects, is achieved with a filter-holder support comprising a guide system configured to guide the filter holder by means of a substantially translational movement. The filter-holder support is also configured to move the filter holder towards the group by means of a rotational movement, preferably about a substantially horizontal axis.

According to a first aspect, the present invention relates to a dispensing group of an espresso coffee machine, wherein said group comprises:

a coffee boiler configured to contain pressurized hot water;

a supply duct for feeding hot water under pressure towards a puck of coffee powder, and a filter-holder support comprising guides forming at least one sliding surface for slidably supporting a filter holder, wherein said filter-holder support is rotatable between a first position for inserting the filter holder and a second dispensing position and wherein said dispensing group comprises a mechanical locking device for locking said filter-holder support in said second dispensing position.

Preferably, the coffee boiler is made at least partially of a heat conducting material.

Preferably, the filter-holder support is made at least partially of a heat conducting material.

Preferably, the filter-holder support is rotatably hinged to the coffee boiler so that heat is transmitted from the coffee boiler to the filter-holder support and to the filter-holder. Therefore, advantageously, the content of the filter (namely the puck of coffee powder) becomes heated even before the pressurized hot water flows towards the puck of coffee powder. This creates lower stress to the puck of coffee because the thermal shock on the ground coffee is reduced compared to known systems where the filter-holder is not heated. As a result, the quality of brewed shots is remarkably improved.

Another advantage of the above embodiment is that the heat used for heating the filter-holder (and finally the puck of coffee) does not require any additional heating means, such as electric resistances or the like. This means that power consumption is not increased and there is no additional risk of failure of electric components.

It should be said that safety for the user is guaranteed by the fact that the filter holder typically comprises an insulated handle for user's handling.

Preferably, the filter-holder support is rotatable about an axis substantially parallel to, or lying in, the sliding plane of the guides.

The filter-holder support may comprise an elastic member for retaining the filter holder in a position at the bottom of a substantially semicircular housing of the filter-holder support.

According to one embodiment, the mechanical locking device comprises a hook and a projecting pin engageable by said hook in at least one stable locking position.

Preferably the hook is rotatably fixed to a fixed part of the dispensing group and the projecting pin is fixed to the filter-holder support.

Preferably, the hook is rigidly attached to an actuating lever.

In embodiments a group gasket is provided for forming a seal between an edge of the filter in the filter holder and a diffuser which diffuses water under pressure towards said puck of coffee powder.

In embodiments a piston actuated by pressurized water between a raised position and a lowered dispensing position is also provided.

According to another aspect, the present invention comprises a machine for preparing and dispensing espresso coffee, comprising at least one dispensing group of the aforementioned type.

BRIEF DESCRIPTION OF THE DRAWINGS

The present invention will become clearer from the following description, provided by way of a non-limiting example, to be read with reference to the accompanying drawings, in which:

FIG. 2.1 illustrates the step preceding the actual insertion of the filter holder into the associated support;

FIG. 2.2 shows a cross-section of the view shown in FIG. 2.1;

FIG. 2.3 shows a larger-scale view of FIG. 2.1;

FIG. 2.4 shows a larger-scale view of FIG. 2.2;

FIG. 4.1 is a cross-section which shows the filter holder inserted in the support and the support locked;

FIG. 4.2 shows a part of FIG. 4.1 on a larger scale;

FIG. 5.1 is a cross-section which shows the filter holder inserted in the support, the support locked and the piston in the low position;

FIG. 5.2 shows a part of FIG. 5.1 on a larger scale;

DETAILED DESCRIPTION OF EMBODIMENTS

The description below, for the sake of convenience, refers in particular to an espresso coffee machine, but the present invention is not limited to such machines and is applicable to machines for dispensing other beverages. For example, barley or another cereal powder may be used instead of coffee powder. Therefore, the expression "espresso coffee machine" must be understood as comprising also machines for preparing other beverages. Similarly, the expression "espresso coffee" must be understood as having a wider meaning corresponding to the product (coffee, barley or other cereal) used for the preparation of the beverage.

The present invention is applicable to any coffee machine, in particular of the manually operated, automatic, semi-automatic or completely automatic type.

Figure 1:
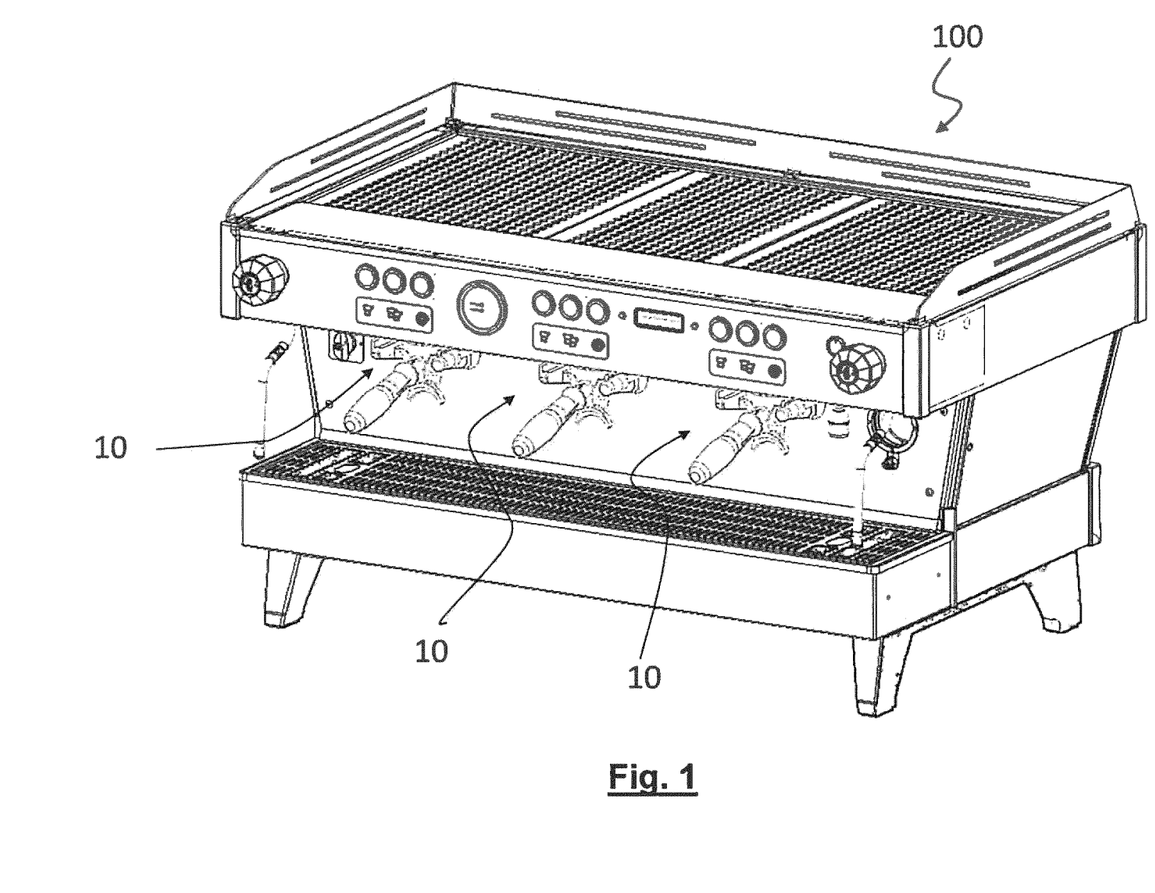
FIG. 1 shows, purely by way of example, an espresso coffee machine with dispensing groups provided with an improved engaging system according to the present invention.

Purely by way of example FIG. 1 shows an espresso coffee machine 100 provided with three dispensing groups 10 with the filter-holder support according to an embodiment of the present invention. In other machines a single dispensing group, two dispensing groups or more than three dispensing groups may be present.

In the present invention only the components of the machine which are relevant for the purposes of understanding of the present invention will be described, while all the components of the machine which do not have a significant influence on the present invention will not be described.

The various figures show a dispensing group comprising a filter-holder support according to the present invention during the various operating configurations and steps. They also show a system for locking the filter-holder support.

In the present description and claims, the expression "filter-holder" is deemed to be equivalent to "portafilter". The filter holder 1 comprises a container body 2 which is open at the top and provided at the bottom with a (single or double) spout which is typically curved. The filter holder 1 preferably comprises a handle or grip 4 projecting from the side surface of the container body 2. The filter holder preferably comprises two support flanges 5 projecting outwards from the side surface of the container body 2. Preferably, the flanges 5 are situated on top and on the sides in relation to the handle 4.

Figure 42:
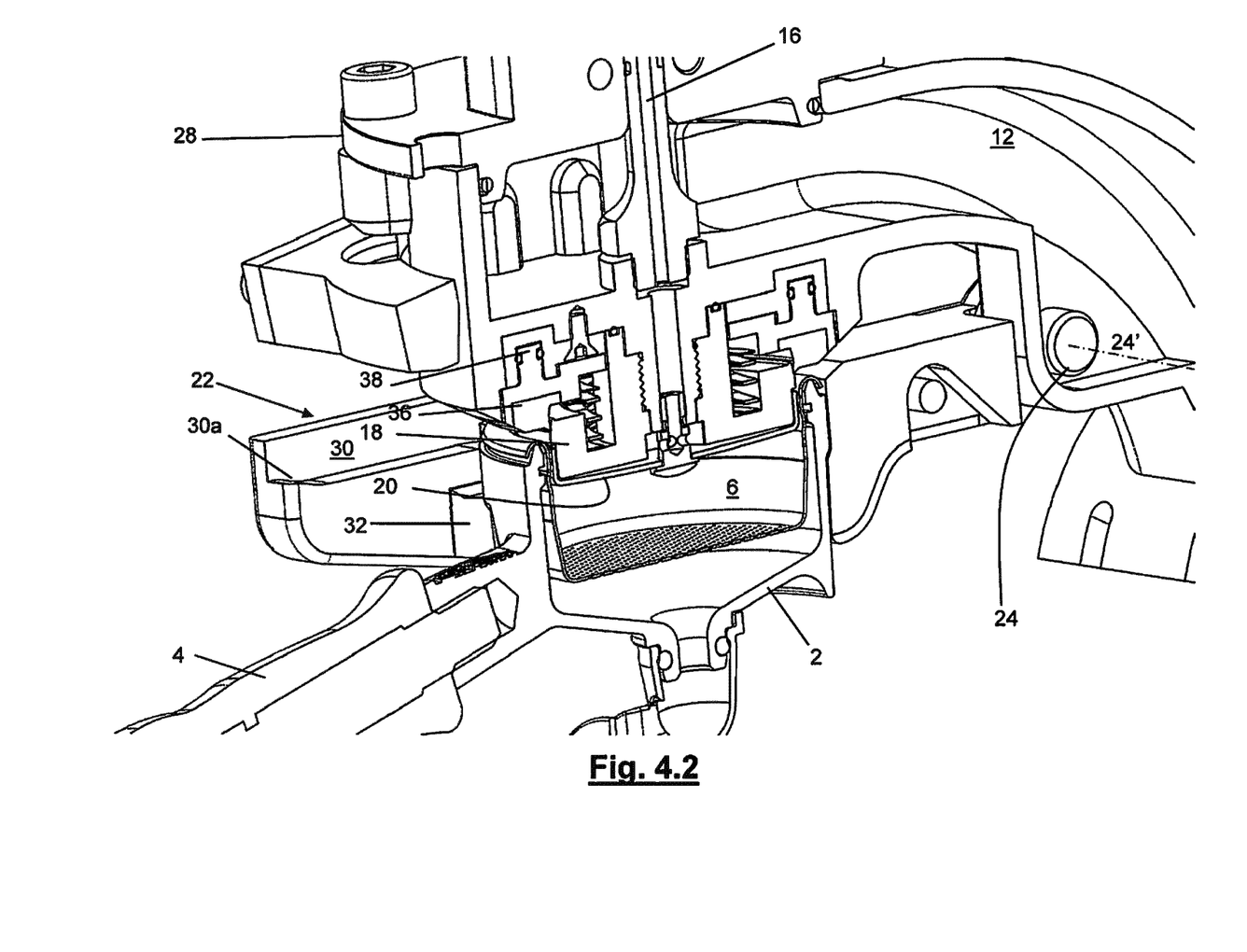

The container body 2 of the filter holder 1 is configured to receive and house a filter 6 (visible for example in FIG. 4.2). The filter 6 in turn is designed to contain coffee powder or the like. The filter 6 typically is cup-shaped with a bottom provided with holes for allowing the dispensed beverage to pass through. Preferably, the filter holder 1 is provided with a top edge configured to support the filter 6 relative to the container body 2 of the filter holder 1.

The dispensing group 10 according to the present invention comprises a coffee boiler 12 which is partially shown and is designed to contain pressurized hot water for the preparation of espresso coffee or the like. Coffee boiler 12 is partially shown in several figures and it is shown in a complete manner in FIG. 8. According to one advantageous embodiment, the coffee boiler comprises a cylinder and a curved neck to the dispensing group 10.

The dispensing group 10 comprises a three-way dispensing solenoid valve 14 which draws pressurized hot water from the coffee boiler 12. The pressurized hot water is transported via an axial conduit 16 towards the coffee powder (not shown) contained inside the filter 6, passing, for example, through a diffuser 18 and a so-called "shower screen" 20 which uniformly distributes the jet of water over the puck of coffee powder inside the filter 6.

The dispensing group 10 according to the present invention comprises a filter-holder support 22. Preferably, the filter-holder support 22 comprises a substantially C-shaped or fork-shaped member. Preferably, the filter-holder support 22 is rotatable about a pin 24. Preferably, the filter-holder support 22 is hinged together with the boiler 12 and rotatable relative thereto between a lowered position and a raised position. These positions will be described more fully in the continuation of the present description. The pin 24 has an axis of rotation which is preferably substantially horizontal.

Figure 23:
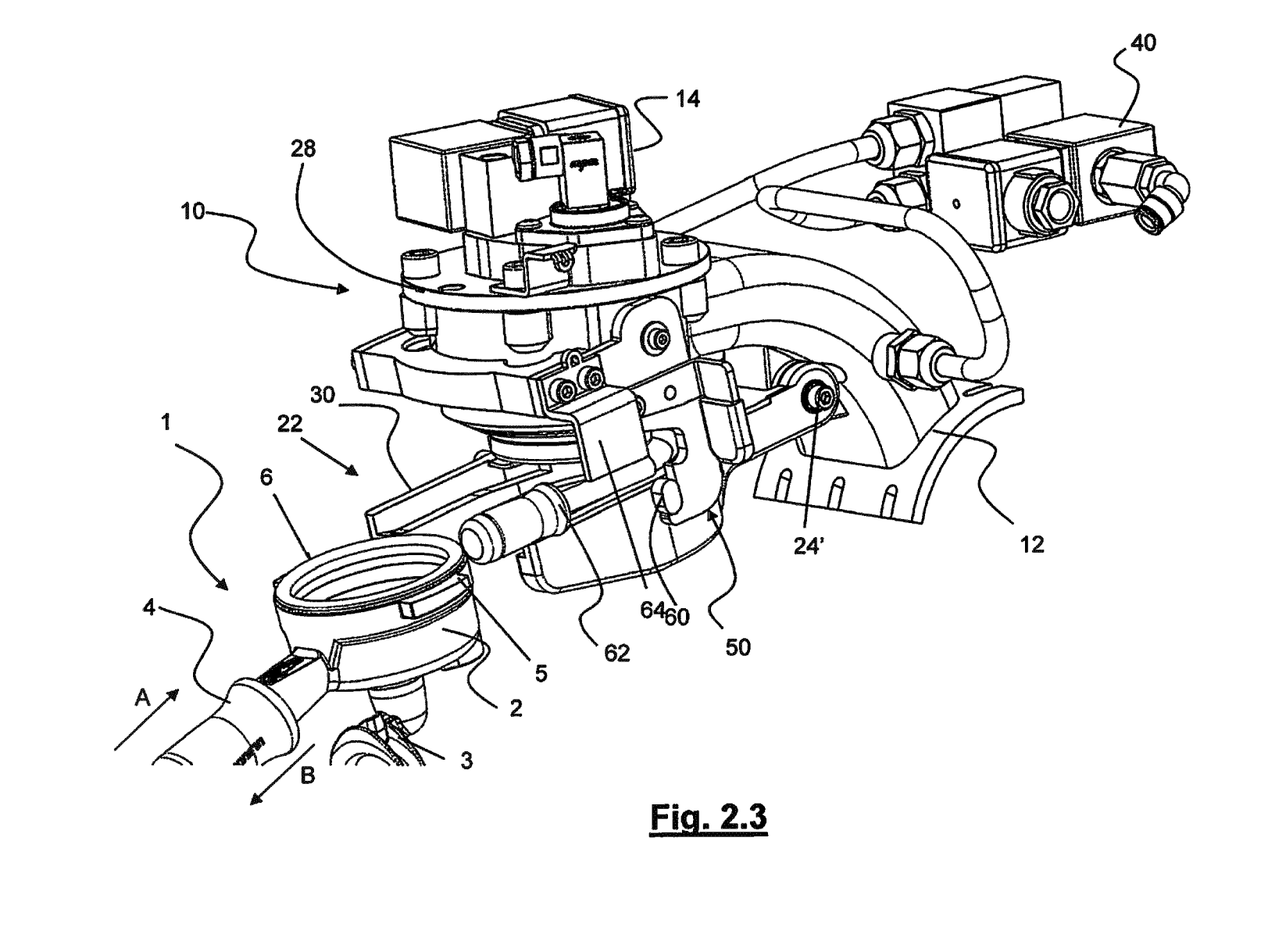
Figure 24:
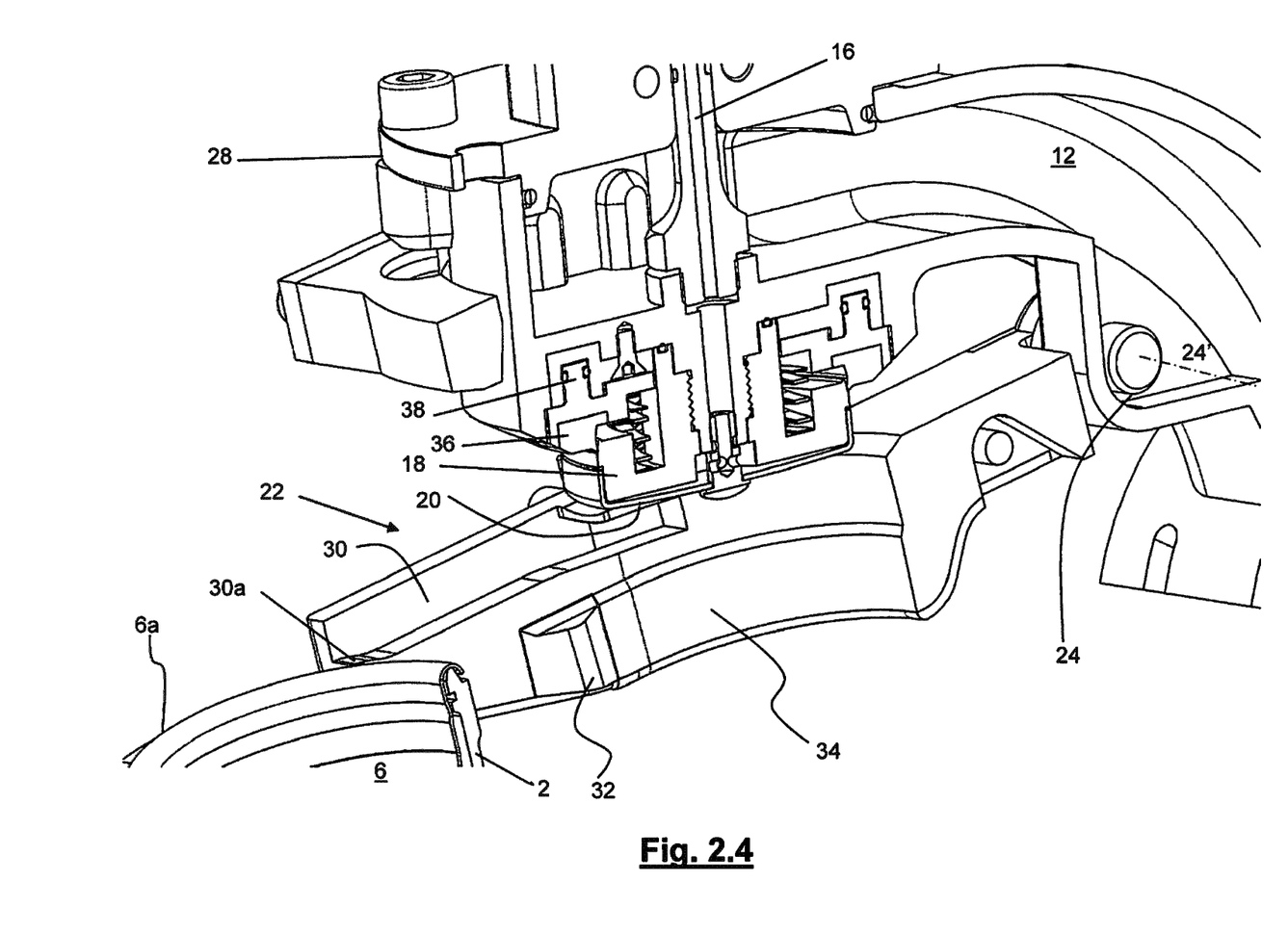

The filter-holder support 22 comprises two substantially flat and parallel guides 30 for supporting the filter holder 1 during a translational movement before a dispensing operation (direction A in FIG. 2.3) or at the end of a dispensing operation (direction of the arrow B in FIG. 2.3).

Preferably, the first section 30a of the guides 30 is slightly raised so as to form a guide surface and indicate to the bartender, when he/she pulls the filter holder 1 towards him/herself at the end of a dispensing operation, that the filter holder 1 is losing contact with the guides 30 and must therefore be completely supported by the bartender.

Preferably, the filter-holder support 22 comprises a substantially semicircular housing 34 at the bottom of the C-shaped member 22. The semicircular housing 34 is configured to embrace and receive the portion of the container body 2 of the filter holder 1 opposite to the handle 4 so as to distribute better the heat from the boiler group 12 onto the container body 2 and consequently onto the filter 6.

Preferably, the semicircular housing 34 comprises at least one elastic tooth 32. Preferably two elastic teeth 32 are provided, each one at the ends of the semicircular housing 34. When the filter holder 1 is forced towards the bottom 34 of the filter-holder support 22, the elastic teeth 32 retract inside a corresponding cavity (the pushing force exerted by the bartender acts against a slight elastic force which tends to push the elastic teeth 32 outwards). When the filter holder 1 reaches its end-of-travel position completely housed inside the semicircular housing 34, the teeth 32 come out of their cavity and retain the filter holder 1 in position. This is advantageous both during insertion of the filter holder 1 before a dispensing operation and during extraction thereof. As will become clearer below, this measure proves to be very advantageous when the filter-holder support 22 is in its lowered position (inclined relative to the horizontal position). If the teeth 32 were not present, the bartender would have to pay more attention during insertion and extraction of the filter holder 1.

Preferably the teeth have a roughly triangular shape with chamfered corners.

According to an embodiment of the present invention, the dispensing group 10 comprises a group gasket 36 and a piston 38 displaceable from a high position into a low position. In the present description, every reference to the position of a component (for example "high" or "low") is not limiting, but is only given for greater clarity of the invention and refers to the drawings.

According to a preferred embodiment of the present invention, the translational movement of the piston 38 is performed by means of the force exerted by the hot water under pressure present inside the coffee boiler 12. More precisely, according to an embodiment of the present invention, the dispensing group 10 comprises an additional three-way solenoid valve 40 configured to remove hot water under pressure from the coffee boiler 12 and introduce it into a small chamber 42 in the top part of the dispensing group 10. In a closed position of the said additional three-way solenoid valve 40, the water under pressure pushes the piston 38 downwards so as to ensure a perfect sealed closure between the filter 6 with the coffee powder and the group gasket 36. In a released position, the solenoid valve 40 stops supplying water under pressure and the piston 38 returns into the raised position where there is no longer a seal between the group gasket 36 and the filter 6.

According to preferred embodiments, the dispensing group 10 according to the present invention comprises a mechanical locking device 50 for locking the filter-holder support 22 in the raised position ready for dispensing.

The mechanical locking device 50 comprises a shaped hook 52, a projecting pin 60 and an actuating lever 62. The lever 62 of the locking device may be provided on one side of the dispensing group 10 (for example on the right as shown in the various figures) or in a central position. This second solution is preferred to allow easy use by right-hand or left-hand operators.

The lever 62 is rigidly connected to the hook 52, for example by means of a suitably shaped bracket 64. The hook 52 is rotatably pivoted on the top part of the dispensing group 10, for example on the cover 28. The projecting pin 60 is instead rigidly connected to the filter-holder support 22. According to an embodiment of the invention, the projecting pin 60 has a roughly elliptical cross-section.

The hook 52 comprises a cam with a first recess 54 for forming a support position for the filter-holder support 22 in its lowered position. The cam also comprises a substantially straight section 56 and a second recess 58 for retaining the pin 60. When the pin 60 is inside the second recess 58, the filter-holder support 22 is locked relative to the rest of the dispensing unit 10 and can no longer rotate. In order to move the lever 52 with respect to the projecting pin 60, the bartender raises or lowers the lever 62.

Having described the main components of the dispensing group 10 according to the present invention, the various operating steps will be described hereinbelow.

FIGS. 2.1, 2.2, 2.3 and 2.4 show the step which precedes the actual insertion of the filter holder 1 inside the filter-holder support 22, before starting the dispensing of a coffee. For simpler illustration, the filter 6 is shown empty, without any coffee powder. In this configuration, the filter-holder support 22 is in its lowered end-of-travel configuration, rotated downwards; the projecting pin 60 is housed inside the first recess 54. The filter-holder support 22 is therefore slightly inclined downwards. This makes it particular easy for the bartender to slide the flanges 5 of the filter holder 1 along the guides 30 of the filter-holder support 22 and makes the guides 30 of the filter-holder support 22 visible. As already mentioned, the entry section 30a of the guides 30 is slightly inclined to form a guide surface or slide. In this configuration, as shown in the larger-scale view of FIG. 2.4, the piston 38 is completely raised and does not interfere with the further inserting movement of the filter holder 1 towards the bottom 34 of the filter-holder support 22. Still with reference in particular to FIG. 2.4, it is possible to see one of the two elastic teeth 32 pushed elastically outwards by a spring or the like (not shown).

Figure 3:
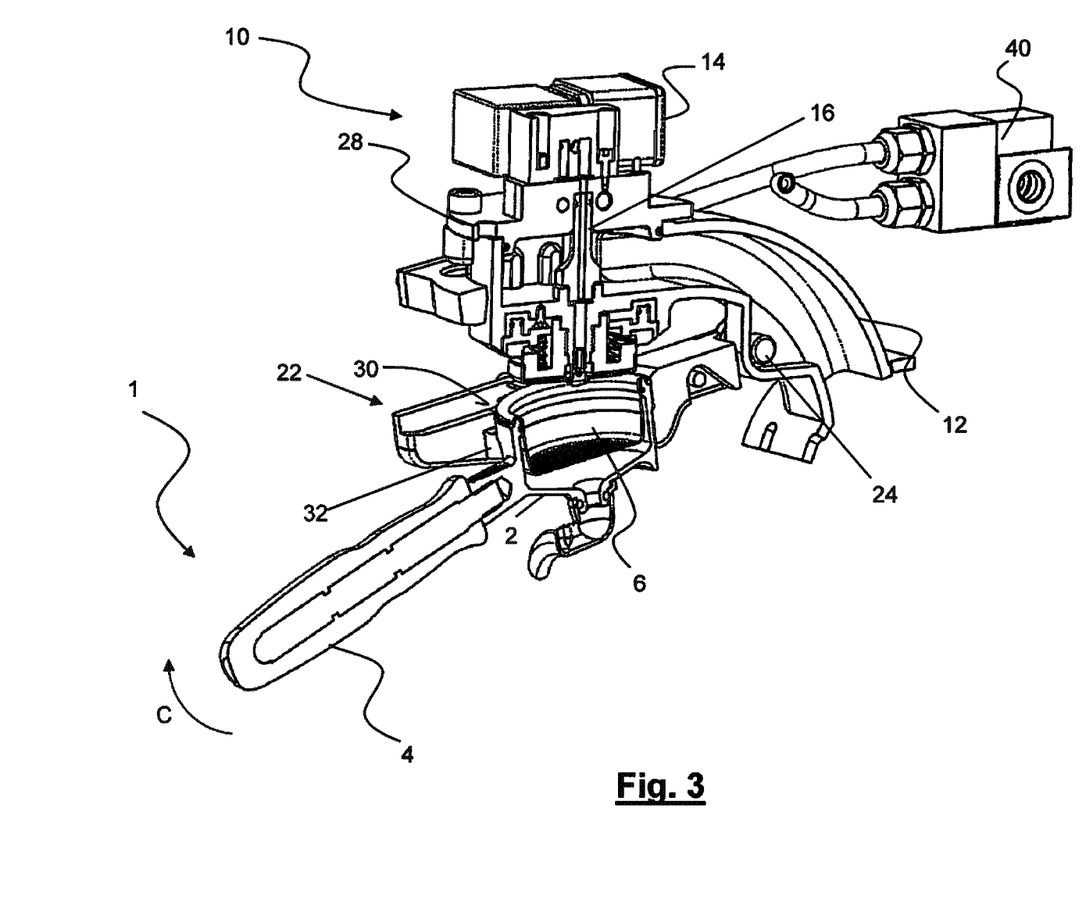
FIG. 3 is a cross-section which shows the filter holder inserted in the support.

FIG. 3 is a cross-section which shows the filter holder 1 completely housed inside the filter-holder support 22. In order to reach this position, the bartender pushes the filter holder 1 into the position where the filter holder 1 is completely enclosed inside the semicircular housing 34. More precisely, during this movement, the bartender causes the flanges 5 of the filter-holder to slide on the guides 30. Therefore, the bartender does not have to support the weight of the filter holder or the coffee powder contained inside it.

During the guided movement of the filter holder 1, the teeth 32 are retracted elastically inside the respective seats and move out elastically when the filter holder 1 has reached its position at the bottom of the filter-holder support 22.

The elastic force of the teeth 32 is weak and the bartender does not have any difficulty in forcing the filter holder 1 to reach the desired position. However, advantageously, the elastic force of the teeth 32 is in any case sufficient to exert a retaining action to prevent the filter holder sliding along the inclined guides (both during insertion and during extraction of the filter holder). In other words, the bartender, once the filter holder 1 has been introduced, may easily raise the filter-holder support 22 by performing a levering action with the handle 4 of the filter holder, but does not have to bother about keeping the filter holder pushed inside the semicircular housing 34.

In FIG. 3 the filter-holder support 22 is not locked by means of the locking device 50 and the projecting pin 60 is still inside the first recess 54.

Figure 41:
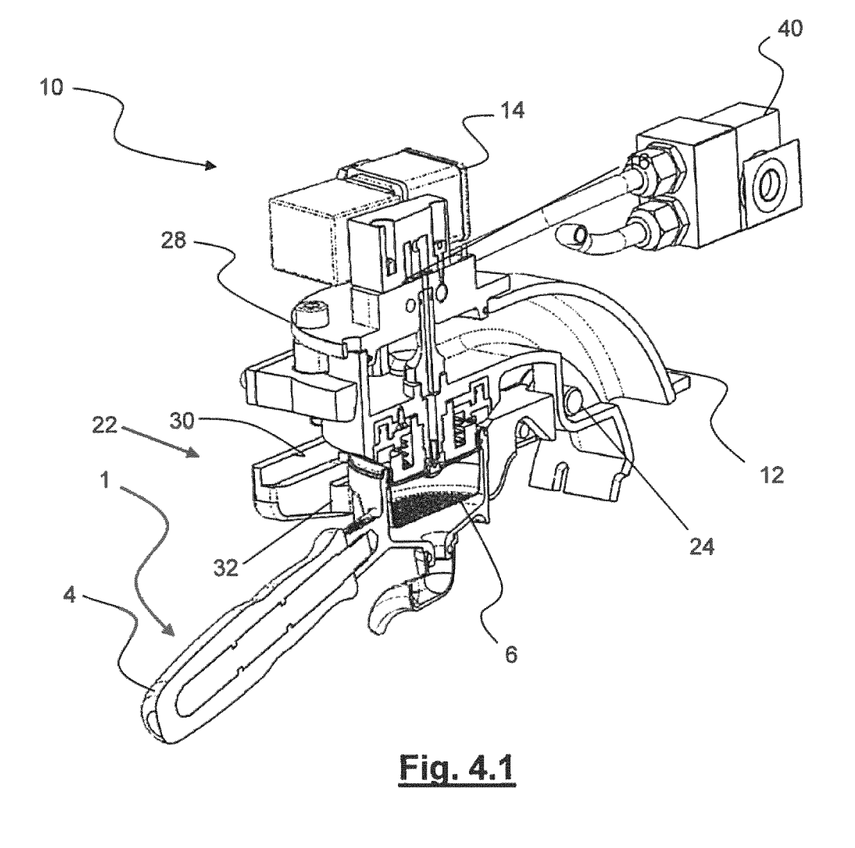

FIGS. 4.1 and 4.2 show, with two different degrees of detail, the dispensing group 10 in the configuration where the filter-holder support 22 is in its higher position, but not locked by means of the locking device 50. In this position, the piston 38 is still in its high position.

Figure 51:
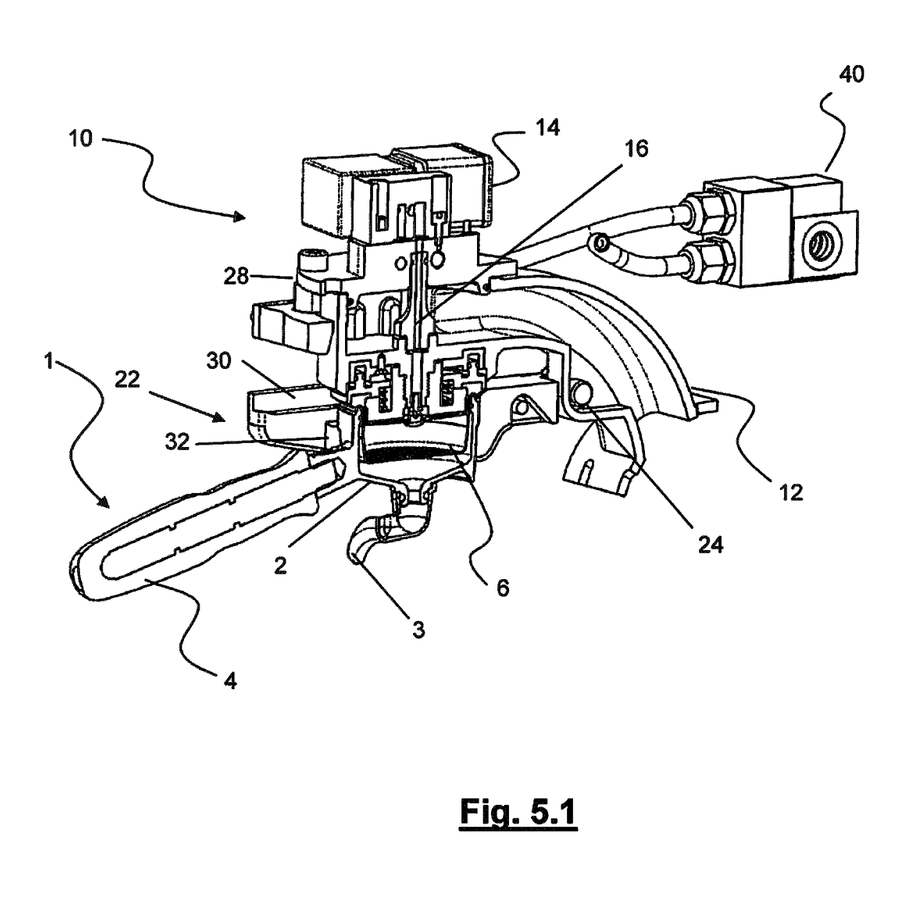
Figure 52:
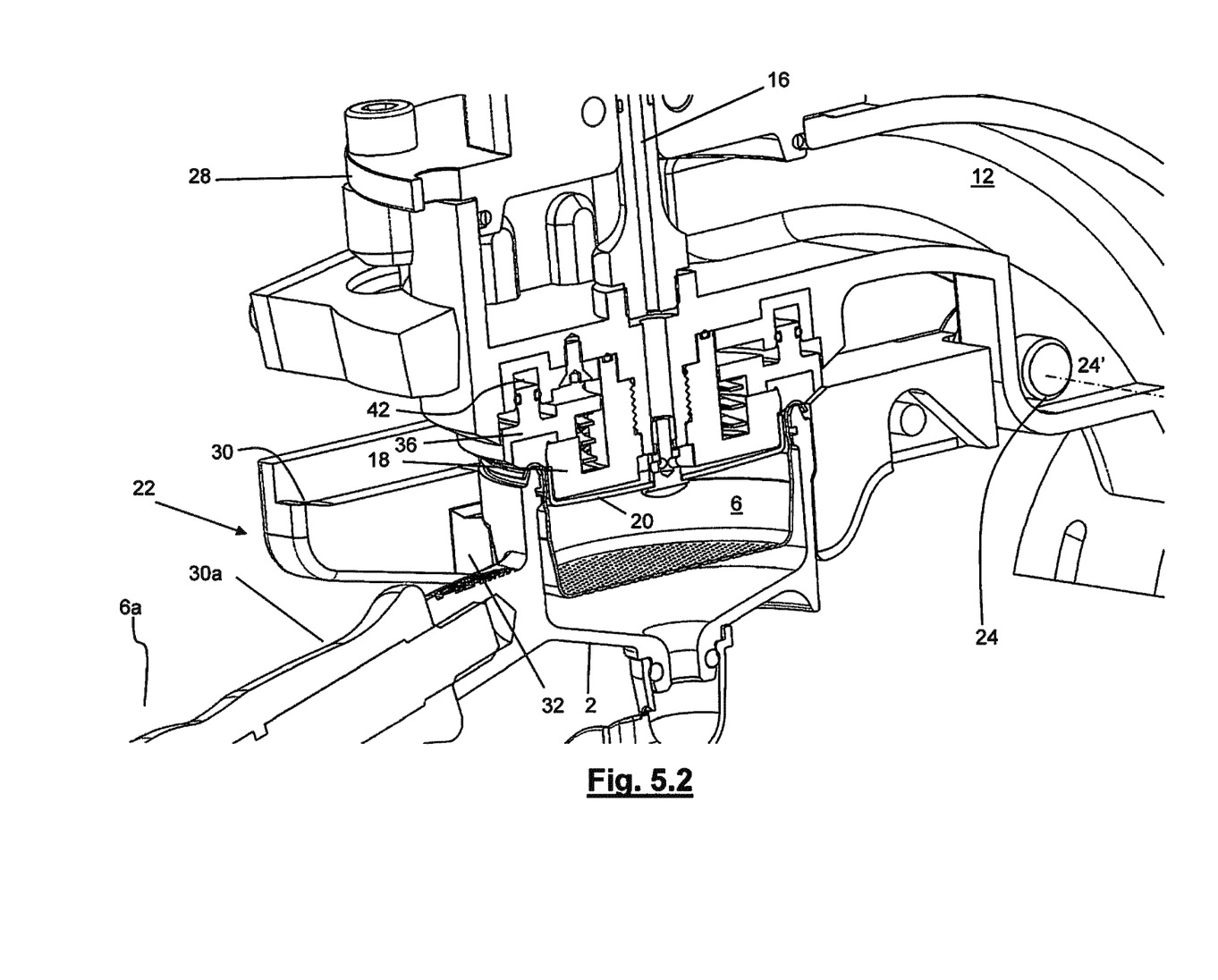

FIGS. 5.1 and 5.2 show, with two different degrees of detail, the dispensing group 10 in the configuration where the filter-holder support 22 is in its higher position and locked by means of the locking device 50. In this position, the piston 38 is in its low position and dispensing may take place. At the end of dispensing, the pressure on the piston 38 is released by means of the solenoid valve 40; the locking device 50 is released by means of the lever 62 and the bartender is free to extract the filter holder pulling it towards him/herself by means of a sliding movement of the flanges 5 on the guides 30.

Figure 6:
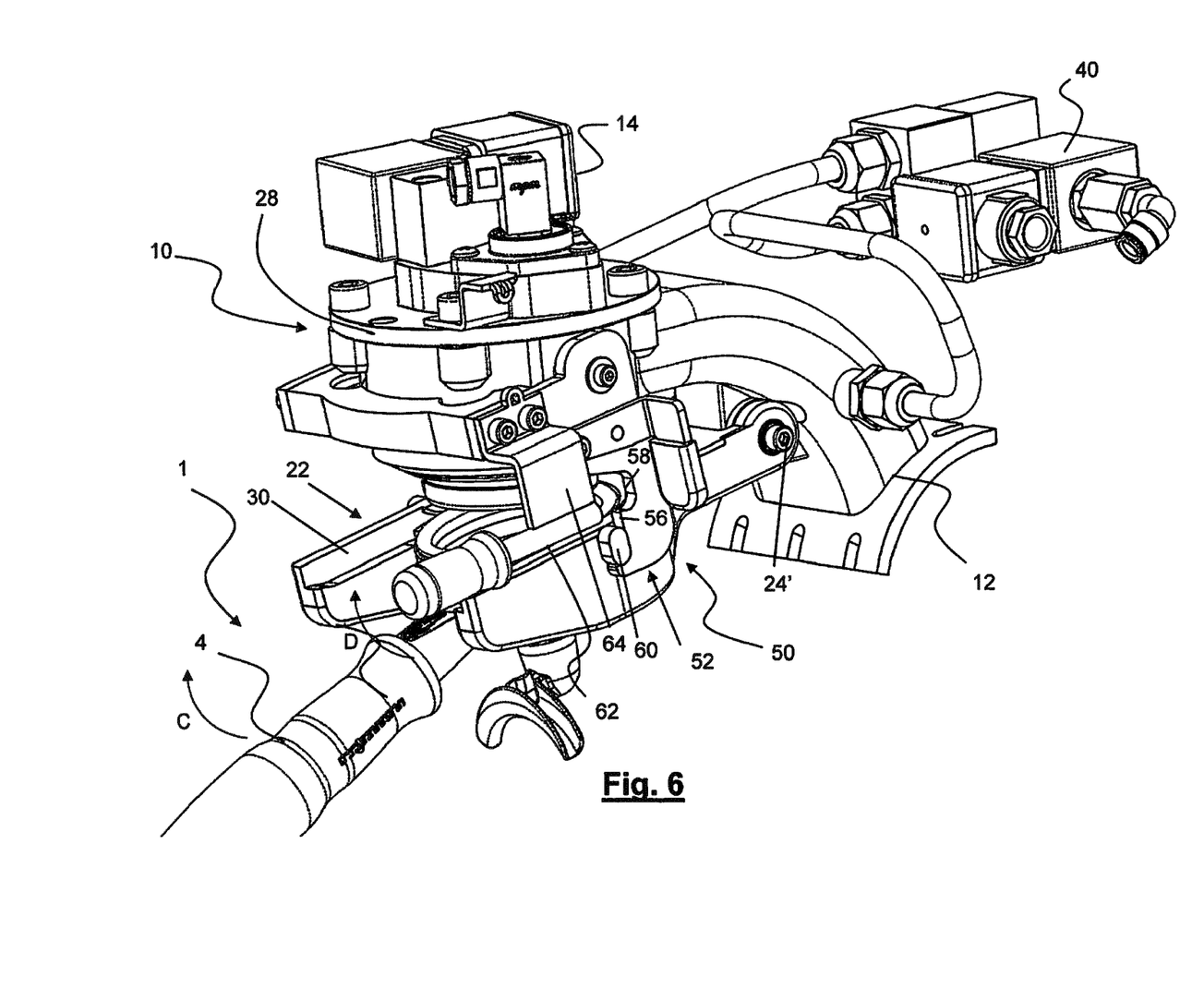
FIG. 6 shows the position in which the filter-holder support is completely unlocked at the end of the dispensing (or before a dispensing operation)
Figure 7:
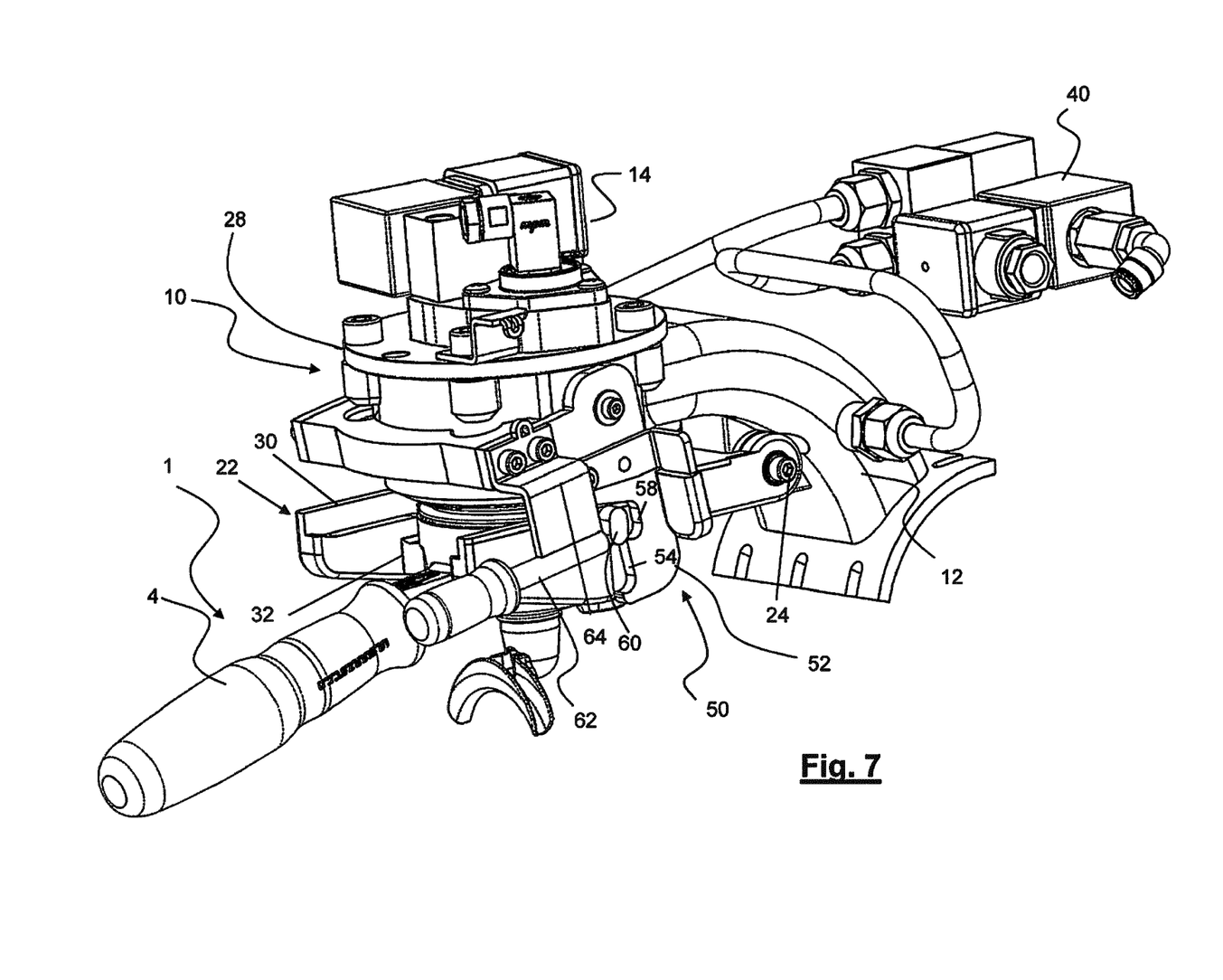
FIG. 7 shows the position in which the filter-holder support is being locked.
Figure 8:
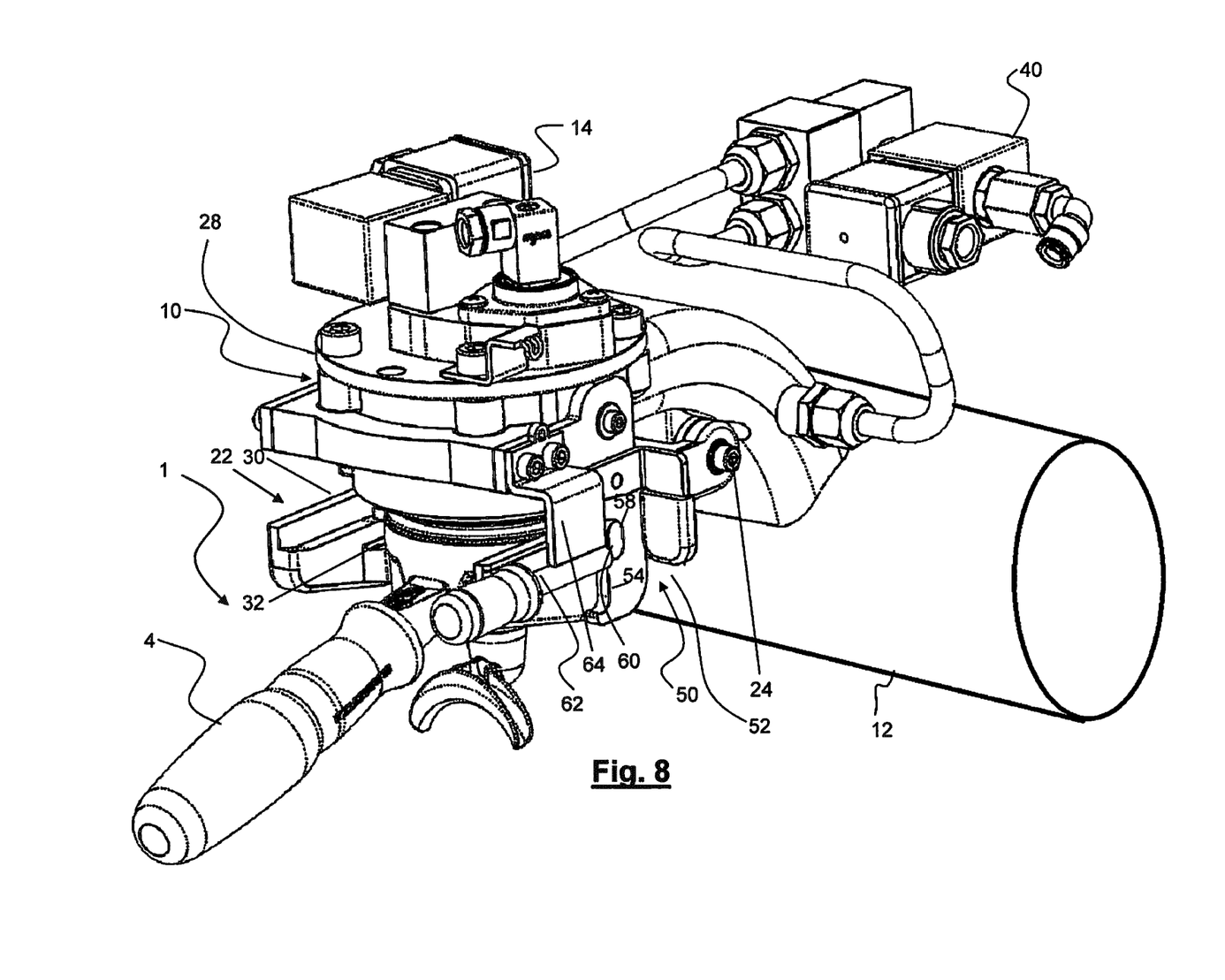
FIG. 8 shows the position in which the filter-holder support is completely locked.
Figure 21:
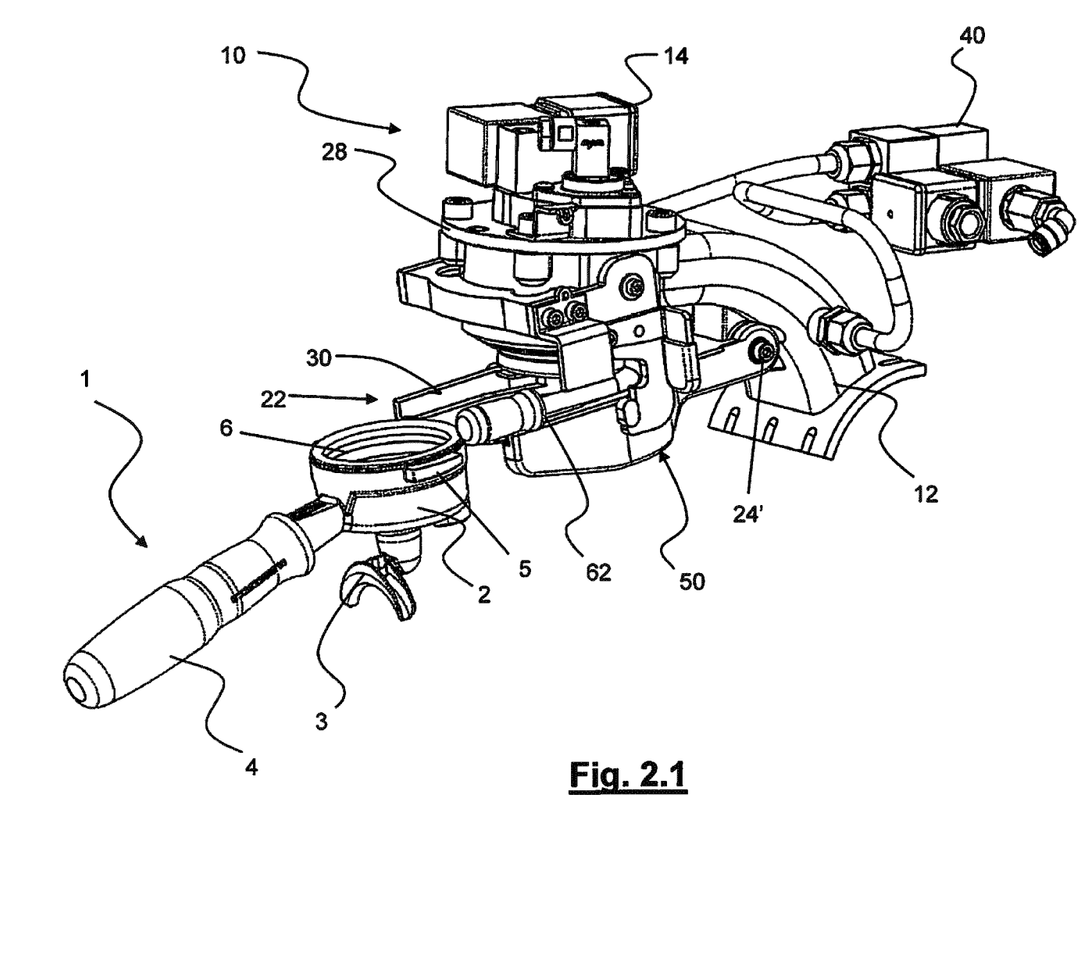
Figure 22:
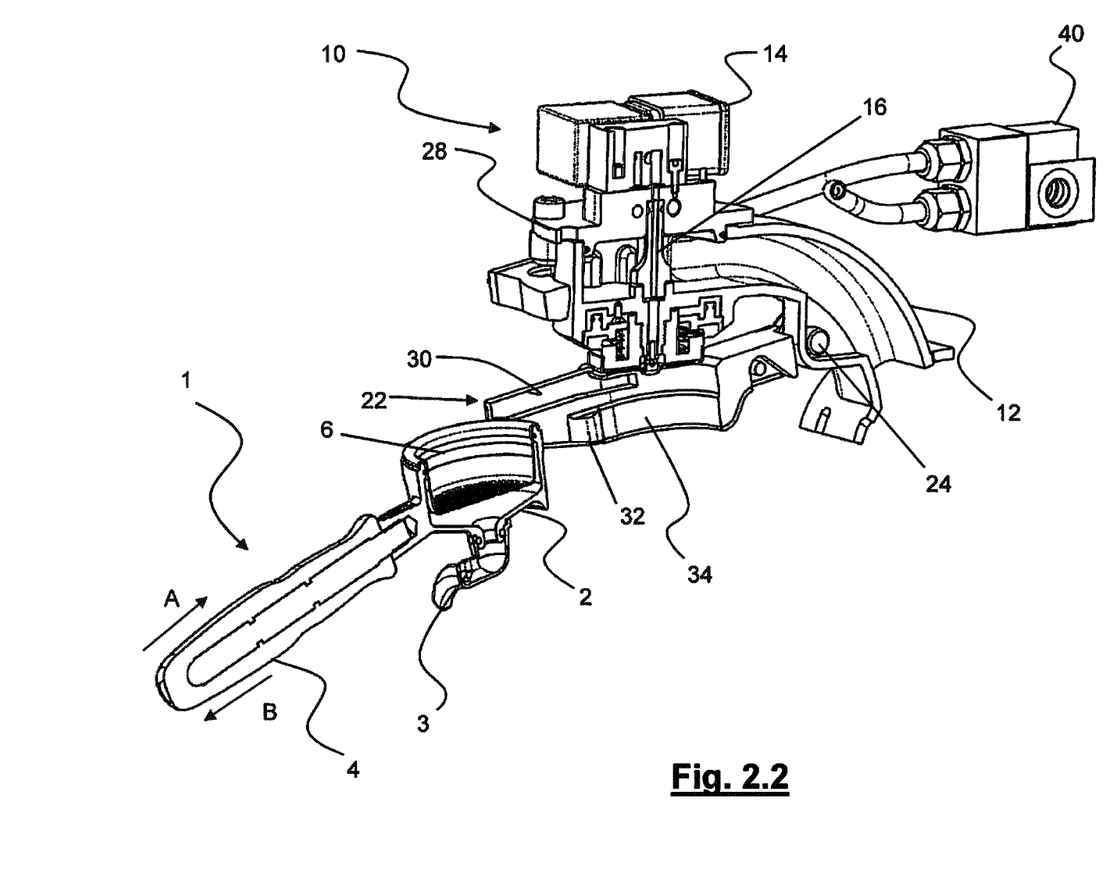

FIGS. 6, 7 and 8 are similar to some of the preceding figures, but show operation of the mechanical locking device 50. In particular, in FIG. 6, the first recess 54 of the hook 52 engages with the projecting pin 60. In this position, the filter-holder support 22 is in its lower position, inclined downwards. This position is the position where the filter holder 1 may be inserted so as to start a new dispensing operation or may be extracted at the end of a dispensing operation. Basically, it is an end-of-travel configuration. The fact that the guides of the filter-holder support are inclined downwards allows easier insertion of the filter holder 1 because the distance between the top part of the dispensing group 10 is greater.

In FIG. 7 the mechanical locking mechanism 50 is shown in an intermediate position between the unlocked position (FIG. 6) and the locked position (FIG. 8). This position is reached by operating the lever 62 and pushing it upwards by means of a rotational movement (arrow D). During this movement, the projecting pin 60 travels along the substantially straight section 56 between the first recess 54 and the second recess 58.

The locking position is shown in FIG. 8. In this position the projecting pin 60 is stably inserted inside the second recess 58 and cannot come out unless a further unlocking movement is performed by the bartender. It is a stable position which ensures a safe condition for the bartender and the machine 100.

According to embodiments, means for signalling that the locking mechanism is completely closed are provided. These means may include, for example, a microswitch connected to other electronic components of the machine, for example a CPU, for allowing dispensing and the downwards movement of the piston.

At the same time means may be provided for signalling that the locking mechanism is completely open. In this case also said means may comprise a microswitch connected to other electronic components of the machine, for example a CPU, for denying consent to perform dispensing.

As mentioned above, advantageously, the support of the filter holder 22 is rotatable. Preferably a hinge with a rotational pin 2 having an axis of rotation 24' connected to the coffee boiler 12 is provided. This solution is particularly advantageous because the rotational pin 24 is able to transfer heat to the filter-holder support 22 and therefore also to the filter holder 1 and the filter 6 inside it. In fact, the filter-holder support 22 and the remainder of the components are made of metallic heat-conducting material. The contact between the filter-holder support 22 and the filter-holder 1 occurs over a broad area which is substantially half the lateral surface area of the container body 2 making contact with the semicircular housing 34.

Advantageously, differently from other known solutions, a piston 38 is provided, said piston being displaceable only as a result of the pressure exerted by the water under pressure drawn from the coffee boiler 12 when the step for dispensing the water needed for preparation of the beverage is initiated. This aspect is also particularly advantageous since energy sources, motors or devices other than those already present in the machine are not required.

In any case the presence of the piston 38 is optional. In fact, according to other embodiments, a group gasket for forming a seal with the edge 6a of the filter 6 is simply provided. This gasket, in particular if made of a soft material, is able on its own to maintain the seal between the filter 6 and the rest of the dispensing group.

The invention claimed is:

1. A dispensing group for an espresso coffee machine, wherein said group comprises:
   a coffee boiler configured to contain pressurized hot water;
   a supply conduit configured to feed hot water under pressure towards a puck of coffee powder; and a filter-holder support comprising guides forming at least one sliding surface for slidably supporting a filter holder, wherein said filter-holder support is rotatable between a first position for inserting the filter holder and a second dispensing position;

wherein said dispensing group comprises a mechanical locking device for locking said filter-holder support in said second dispensing position; and wherein said filter-holder support comprises an elastic member for retaining the filter holder in a position at the bottom of a substantially semicircular housing.

2. The dispensing group according to claim 1,
wherein the coffee boiler is at least partially comprised of a heat conducting material,
wherein the filter-holder support is at least partially comprised of a heat conducting material, and
wherein said filter-holder support is rotatably hinged to said coffee boiler so that heat is transmitted from said coffee boiler to said filter-holder support and to said filter-holder.

3. The dispensing group according to claim 2, wherein said heat conducting material comprises a metal.

4. The dispensing group according to claim 2, comprising a hinge with a rotational pin having an axis of rotation connected to the coffee boiler.

5. The dispensing group according to claim 4, wherein said axis of rotation is substantially parallel to, or lying in, the sliding surface of said guides.

6. The dispensing group according to claim 1, comprising also a group gasket configured to form a seal between an edge of the filter in the filter holder and a diffuser and shower screen configured to diffuse water under pressure towards said puck of coffee powder.

7. The dispensing group according to claim 1, further comprising a piston actuated by pressurized water between a raised position and a lowered dispensing position.

8. A machine for preparing and dispensing coffee comprising at least one dispensing group according to claim 1 and at least a corresponding filter holder.

9. A dispensing group for an espresso coffee machine, wherein said group comprises:

a coffee boiler configured to contain pressurized hot water;

a supply conduit configured to feed hot water under pressure towards a puck of coffee powder; and a filter-holder support comprising guides forming at least one sliding surface for slidably supporting a filter holder, wherein said filter-holder support is rotatable between a first position for inserting the filter holder and a second dispensing position;

wherein said dispensing group comprises a mechanical locking device for locking said filter-holder support in said second dispensing position; and wherein said mechanical locking device comprises a hook and a projecting pin engageable by said hook in at least one stable locking position.

10. The dispensing group according to claim 9, wherein said hook is rotatably fixed to a fixed part of the dispensing group and said projecting pin is fixed to said filter-holder support.

11. The dispensing group according to claim 9, wherein said hook is rigidly attached to an actuating lever.

12. The dispensing group according to claim 9,
wherein the coffee boiler is at least partially comprised of a heat conducting material,
wherein the filter-holder support is at least partially comprised of a heat conducting material, and
wherein said filter-holder support is rotatably hinged to said coffee boiler so that heat is transmitted from said coffee boiler to said filter-holder support and to said filter-holder.

13. The dispensing group according to claim 12, wherein said heat conducting material comprises a metal.

14. The dispensing group according to claim 12, comprising a hinge with a rotational pin having an axis of rotation connected to the coffee boiler.

15. The dispensing group according to claim 14, wherein said axis of rotation is substantially parallel to, or lying in, the sliding surface of said guides.

16. The dispensing group according to claim 9, comprising also a group gasket configured to form a seal between an edge of the filter in the filter holder and a diffuser and shower screen configured to diffuse water under pressure towards said puck of coffee powder.

17. The dispensing group according to claim 9, further comprising a piston actuated by pressurized water between a raised position and a lowered dispensing position.

18. A machine for preparing and dispensing coffee comprising at least one dispensing group according to claim 9 and at least a corresponding filter holder.

\* \* \* \* \*